(12) United States Patent
Ikegaya (10) Patent No.: US 6,729,594 B2
(45) Date of Patent: May 4, 2004

(54) STOPPER STRUCTURE FOR SEAT LIFTER (75) Inventor: Isao Ikegaya, Shizuoka (JP)

(73) Assignee: Fuji Kiko Co., Ltd., Kosai (JP)

( * ) Notice: Subject to any disclaimer, the term of this patent is extended or adjusted under 35 U.S.C. 154(b) by 0 days.

(21) Appl. No.: 10/443,059

(22) Filed: May 22, 2003

(65) Prior Publication Data

US 2003/0222192 A1 Dec. 4, 2003

(30) Foreign Application Priority Data

May 31, 2002 (JP) ........................................ 2002-158469

(51) Int. Cl.[7] .............................................. F16M 13/00
(52) U.S. Cl. ...................................... 248/421; 248/396
(58) Field of Search ................................ 248/429, 421, 248/430, 424, 423, 396; 296/64, 65.1, 68.1; 297/344.1, 463.1, 311

(56) References Cited

U.S. PATENT DOCUMENTS

| 4,159,095 | A | * | 6/1979 | Pallant et al. | 248/396 |
|---|---|---|---|---|---|
| 4,720,070 | A | * | 1/1988 | Nishino | 248/394 |
| 4,770,463 | A | * | 9/1988 | Nishino | 297/367 |
| 4,871,137 | A | * | 10/1989 | Ikegaya | 248/396 |
| 4,986,509 | A | * | 1/1991 | Suzuki et al. | 248/396 |
| 5,568,908 | A | * | 10/1996 | Kisiel | 248/419 |
| 5,882,061 | A | * | 3/1999 | Guillouet | 296/65.05 |
| 6,276,650 | B1 | * | 8/2001 | Kojima et al. | 248/429 |
| 6,464,193 | B1 | * | 10/2002 | Nemoto | 248/421 |
| 6,484,995 | B1 | * | 11/2002 | Nemoto | 248/421 |
| 6,502,799 | B2 | * | 1/2003 | Lepaule | 248/423 |
| 6,616,116 | B1 | * | 9/2003 | Rochau et al. | 248/564 |
| 6,666,423 | B1 | * | 12/2003 | Nemoto | 248/421 |

FOREIGN PATENT DOCUMENTS

| JP | 62-8128 U | 1/1987 |
|---|---|---|
| JP | 1-144240 U | 10/1989 |

* cited by examiner

Primary Examiner—Leslie A. Braun
Assistant Examiner—Kofi Schulterbrandt
(74) Attorney, Agent, or Firm—Foley & Lardner LLP (57) ABSTRACT A stopper structure for a seat lifter includes a stopper formed at another end of a connecting rod to abut on a connecting shaft when a cushion frame is located in a lifting limit position and a lowering limit position with respect to the base frame. When the cushion frame is located in the lifting limit position, the stopper restricts rotation of a sector gear in the direction of lifting the cushion frame with respect to the base frame. When the cushion frame is located in the lowering limit position, the stopper restricts rotation of the sector gear in the direction of lowering the cushion frame with respect to the base frame.

2 Claims, 8 Drawing Sheets

STOPPER STRUCTURE FOR SEAT LIFTER

BACKGROUND OF THE INVENTION

The present invention relates to a stopper structure for a seat lifter for adjusting the seat height.

Typically, the seat lifter comprises a pinion gear, a sector gear meshed therewith, and a link swingably provided to the sector gear, wherein the sector gear is rotated in response to input out of the pinion gear to cause swinging of the link, thus adjusting the seat height.

When the pinion gear includes a shaft fixing portion integrated with a base forming member, and the sector gear includes a rotation shaft integrated therewith, for example, assembling is carried out such that the rotation shaft of the sector gear is mounted to the base forming member with the sector gear not meshed with the pinion gear, then, the sector gear is rotated to mesh with the pinion gear.

SUMMARY OF THE INVENTION

With the sector gear mounted to the pinion gear in such a manner, however, the sector gear needs an additional part such as a stopper pin or additional machining after assembling so as to prevent disengagement of the sector gear from the pinion gear.

It is, therefore, an object of the present invention to provide a stopper structure for a seat lifter, which can prevent disengagement of the sector gear from the pinion gear with enhanced assembling efficiency and reduced manufacturing cost.

The present invention provides generally a stopper structure for a seat lifter, which comprises: a base frame; a bell crank rotatably mounted to the base frame; a cushion frame linked with one swinging end of the bell crank; a pinion gear rotatably mounted to one of the base frame and the cushion frame; a connecting shaft rotatably mounted to the one of the base frame and the cushion frame; a sector gear meshed with the pinion gear, the sector gear being fixed to the connecting shaft, the sector gear being rotated to swing the bell crank for upward and downward movement of the cushion frame with respect to the base frame; a connecting rod having one end linked with another swinging end of the bell crank and another end linked with the sector gear in a position offset with respect to the connecting shaft; and a stopper formed at the another end of the connecting rod, the stopper abutting on the connecting shaft when the cushion frame is located in at least one of a lifting limit position and a lowering limit position with respect to the base frame, when the cushion frame is located in the lifting limit position the stopper restricting rotation of the sector gear in a direction of lifting the cushion frame with respect to the base frame, when the cushion frame is located in the lowering limit position the stopper restricting rotation of the sector gear in a direction of lowering the cushion frame with respect to the base frame.

BRIEF DESCRIPTION OF THE DRAWINGS

The other objects and features of the present invention will become apparent from the following description with reference to the accompanying drawings, wherein.

DETAILED DESCRIPTION OF THE INVENTION

Referring to the drawings, a description is made about a stopper structure for a seat lifter embodying the present invention.

Figure 1:
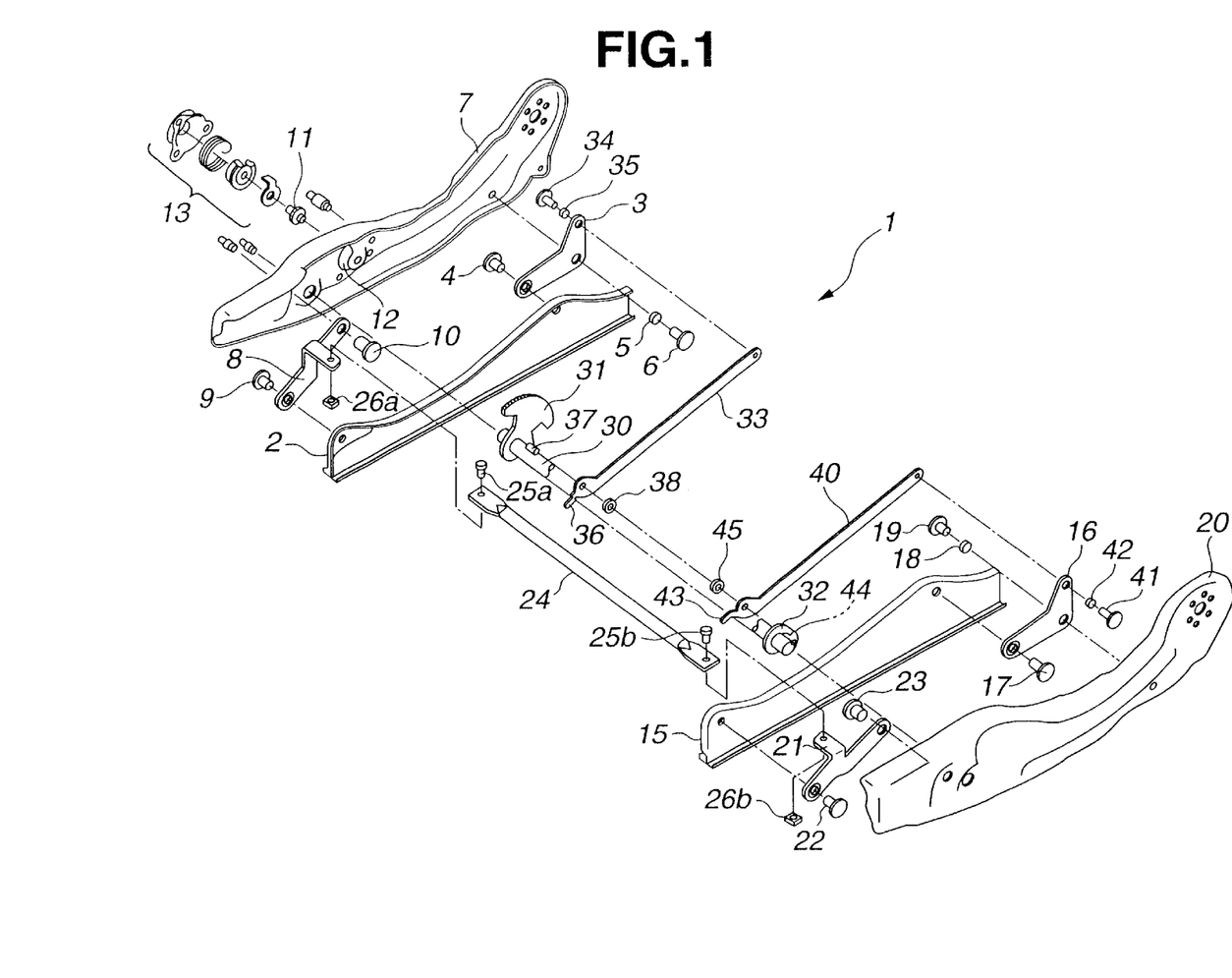
FIG. 1 is an exploded perspective view showing a seat lifter provided with a stopper structure embodying the present invention.
Figure 2:
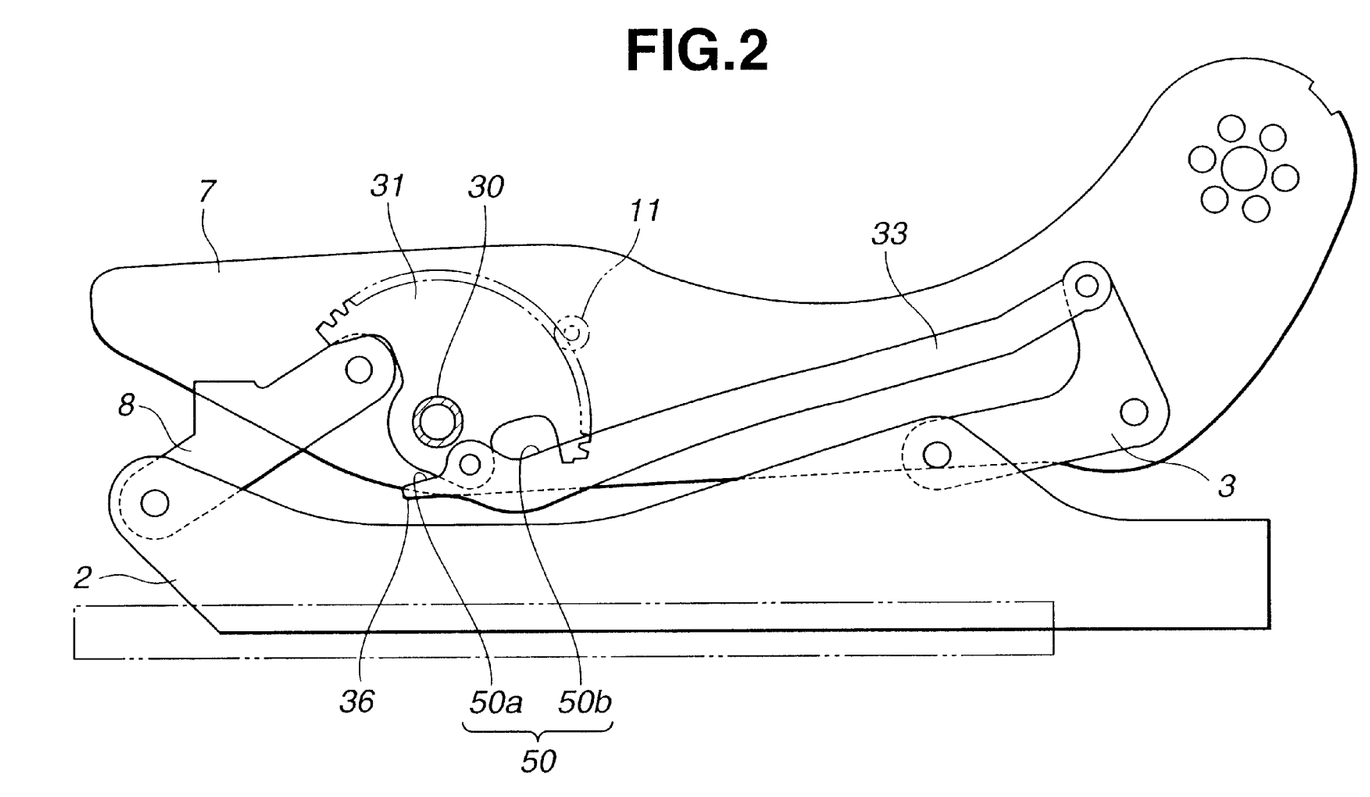
FIG. 2 is a side view showing the seat lifter.

Referring to FIGS. 1 and 2, a seat lifter 1 comprises a driving-side or first base frame 2 and a driving-side or first bell crank 3 rotatably mounted at a rear end of the base frame 2 through a rear link pin 4. One swinging end of the driving-side bell crank 3 is rotatably mounted at a rear end of the driving-side cushion frame 7 through a bush 5 and a rear link pin 6.

A driving-side or first link 8 has one end rotatably mounted at a front end of the driving-side base frame 2 through a front link pin 9. Another end of the driving-side link 8 is rotatably mounted at a front end of the driving-side cushion frame 7 through a front link pin 10.

A pinion gear 11 is mounted at one side face of the driving-side cushion frame 7. The pinion gear 11 is rotatably supported in a hole formed in the driving-side cushion frame 7, and has teeth partly exposed at another side face of the cushion frame 7 through a recessed hole 12. The pinion gear 11 is rotated by rotating an operation knob (not shown), rotation of which is restricted by a brake mechanism 13 except when operating the operation knob.

A driven-side or second bell crank 16 of substantially the same shape as the driving-side bell crank 3 is rotatably mounted at a rear end of a driven-side or second base frame 15 through a rear link pin 17. One swinging end of the driven-side bell crank 16 is rotatably mounted at a rear end of a driven-side or second cushion frame 20 through a bush 18 and rear link pin 19.

A driven-side or second link 21 has one end rotatably mounted at a front end of the driven-side base frame 15 through a front link pin 22. Another end of the driven-side link 21 is rotatably mounted at a front end of the driven-side cushion frame 20 through a front link pin 23.

The driving-side link 8 and the driven-side link 21 are coupled through a connecting pipe 24. The connecting pipe 24 has one end fixed to the driving-side link 8 through a screw 24a and a nut 26a, and another end fixed to the driven-side link 21 through a screw 25b and a nut 26b.

The driving-side cushion frame 7 and the driven-side cushion frame 20 are coupled through a connecting shaft 30. The connecting shaft 30 has one end rotatably mounted in a hole formed in a side face (another side face) of the driving-side cushion frame 7, and another end rotatably mounted in a hole formed in a side face of the driven-side cushion frame 20. A sector gear 31 is fixed at one end of the connecting shaft 30 to mesh with the pinion gear 11, whereas a connecting link 32 is fixed at another end thereof.

The sector gear 31 is linked with the driving-side bell crank 3 through a driving-side or first connecting rod 33. Specifically, the driving-side connecting rod 33 has one end rotatably mounted at another swinging end of the driving-side bell crank 3 through a connecting pin 34 and a bush 35. Another end of the driving-side connecting rod 33 having a protrusion 36 is rotatably mounted to the sector gear 31 in a position offset with respect to the connecting shaft 30 through a connecting pin 37 and a push nut 38. As shown in FIG. 2, a driving-side or first stopper 50 is formed at one end of the driving-side connecting rod 33 to restrict rotation of the sector gear 31. The driving-side stopper 50 comprises a lowering-side stopper portion 50a and lifting-side stopper portion 50b as will be described in detail later.

The connecting link 32 is linked with the driven-side bell crank 16 through a driven-side or second connecting rod 40 of substantially the same shape as the driving-side connecting rod 33. Specifically, the driven-side connecting rod 40 has one end rotatably mounted at another swinging end of the driven-side bell crank 16 through a connecting pin 41 and a bush 42. In the same manner as another end of the driving-side connecting rod 33, another end of the driven-side connecting rod 40 having a protrusion 43 is rotatably mounted to the connecting link 32 in a position offset with respect to the connecting shaft 30 through a connecting pin 44 and a push nut 45. The offset amount of the driven-side connecting rod 40 with respect to the connecting shaft 30 is equal to that of the driving-side connecting rod 33 with respect thereto.

Since the sector gear 31 is fixed to the connecting shaft 30, the sector gear 31 and the pinion gear 11 are assembled such that both ends of the connecting shaft 30 are inserted into the holes of the driving-side cushion frame 7 and the driven-side cushion frame 20, then, the sector gear 31 is rotated to mesh the sector gear 31 with the pinion gear 11. After assembling the sector gear 31 and the pinion gear 11, the driving-side connecting rod 33 and the driven-side connecting rod 40 are mounted, respectively.

Figure 3:
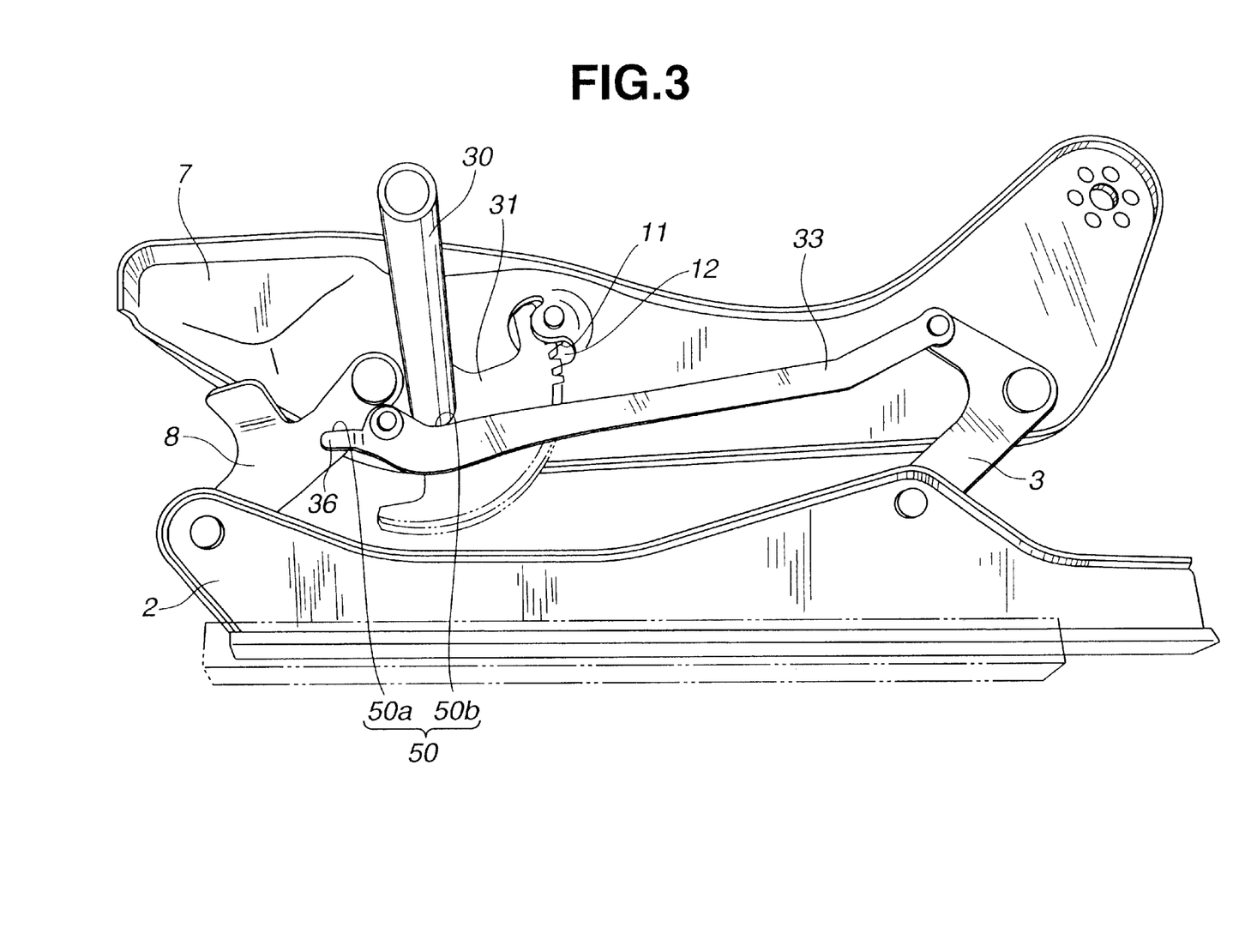
FIG. 3 is a perspective view showing a driving-side cushion frame located in a lifting limit position with respect to a driving-side base frame.
Figure 4:
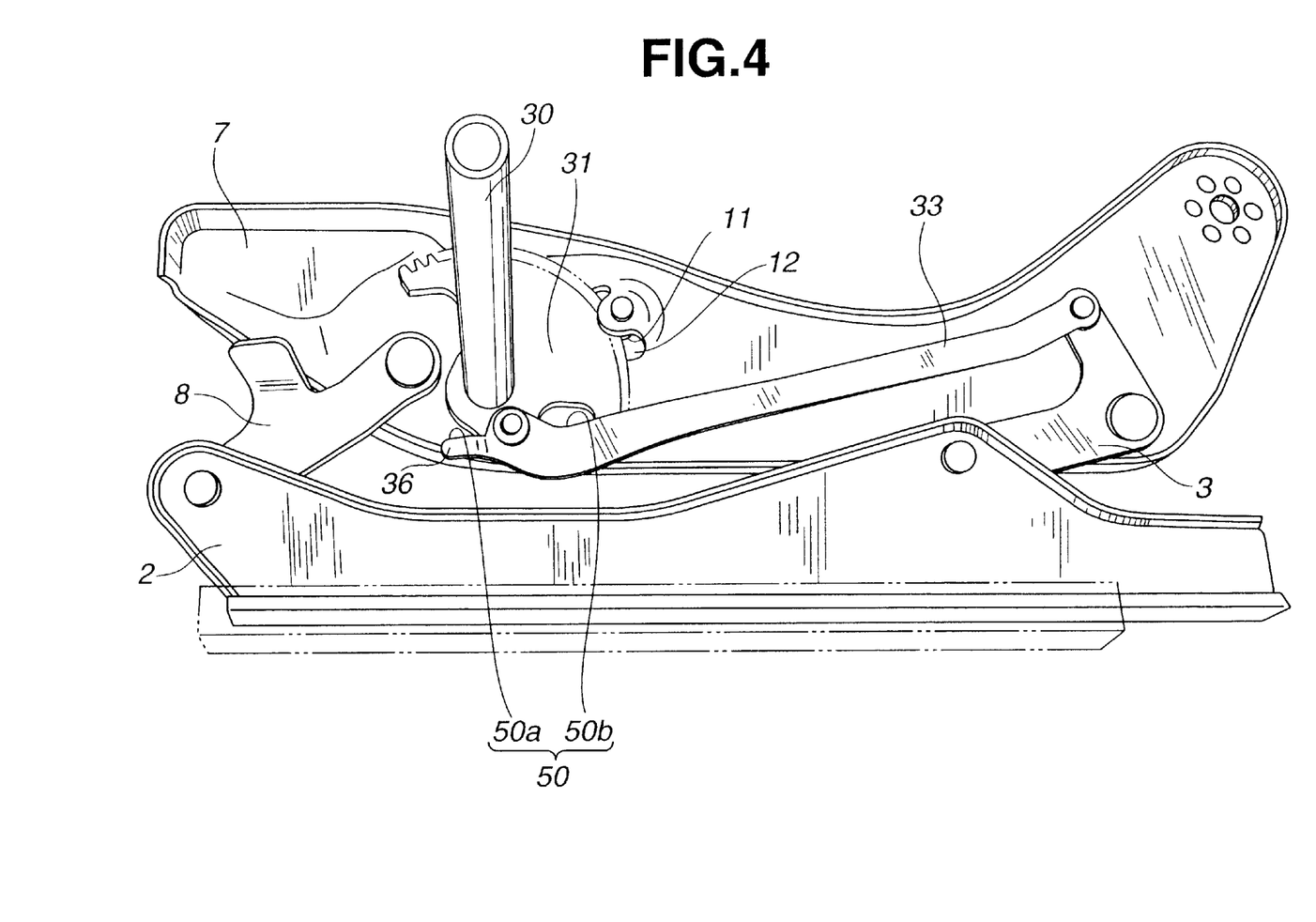
FIG. 4 is a view similar to FIG. 3, showing the driving-side cushion frame located in a middle position with respect to the driving-side base frame.
Figure 5:
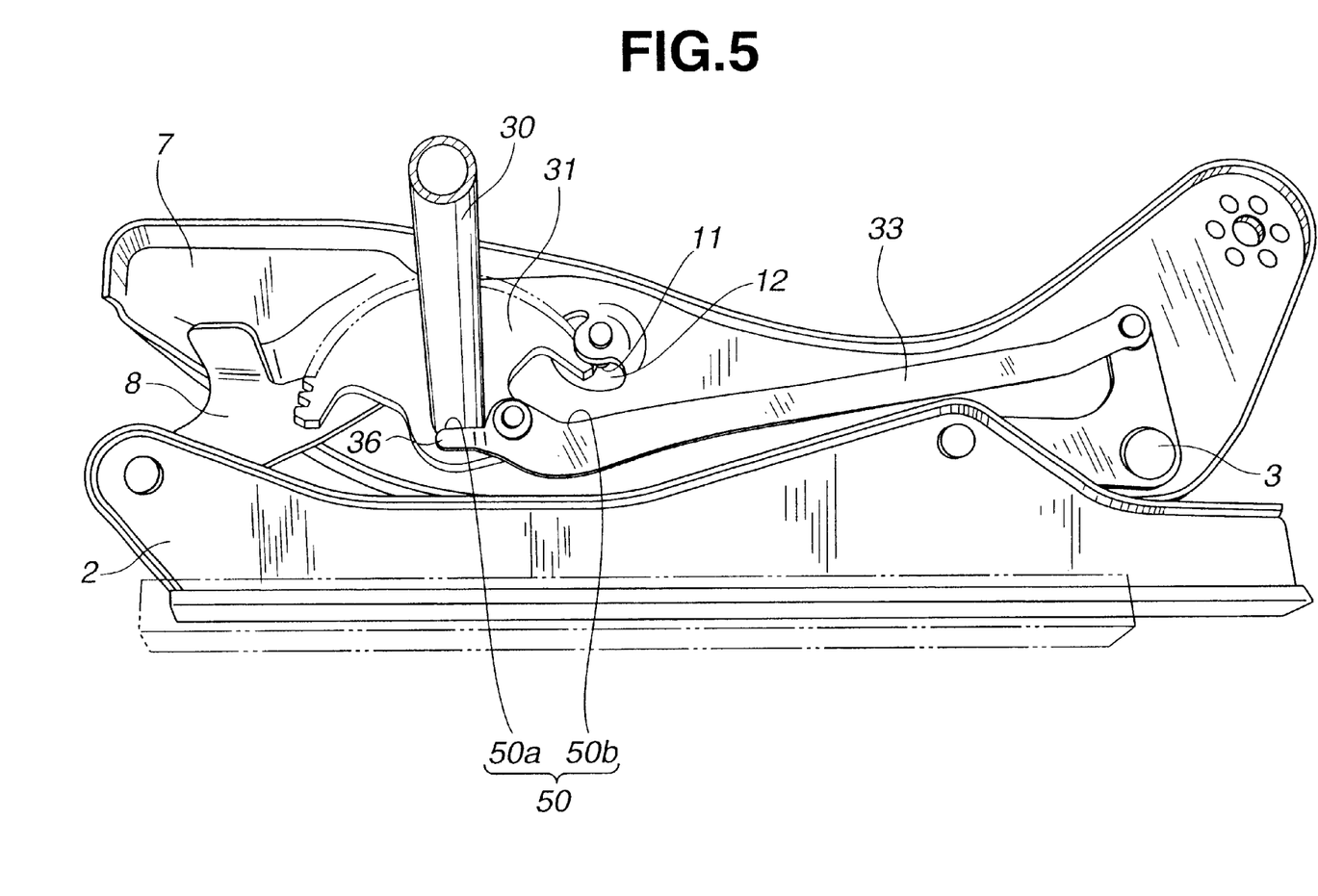
FIG. 5 is a view similar to FIG. 4, showing the driving-side cushion frame located in a lowering limit position with respect to the driving-side base frame.

Operation of the seat lifter 1 is described. Referring to FIGS. 3–5, when rotating the pinion gear 11, the sector gear 11 is rotated to swing the driving-side connecting rod 33 linked with the sector gear 31, causing swinging of the driven-side bell crank 3, thus having upward/downward movement of the driving-side cushion frame 7 with respect to the driving-side base frame 2.

Figure 6:
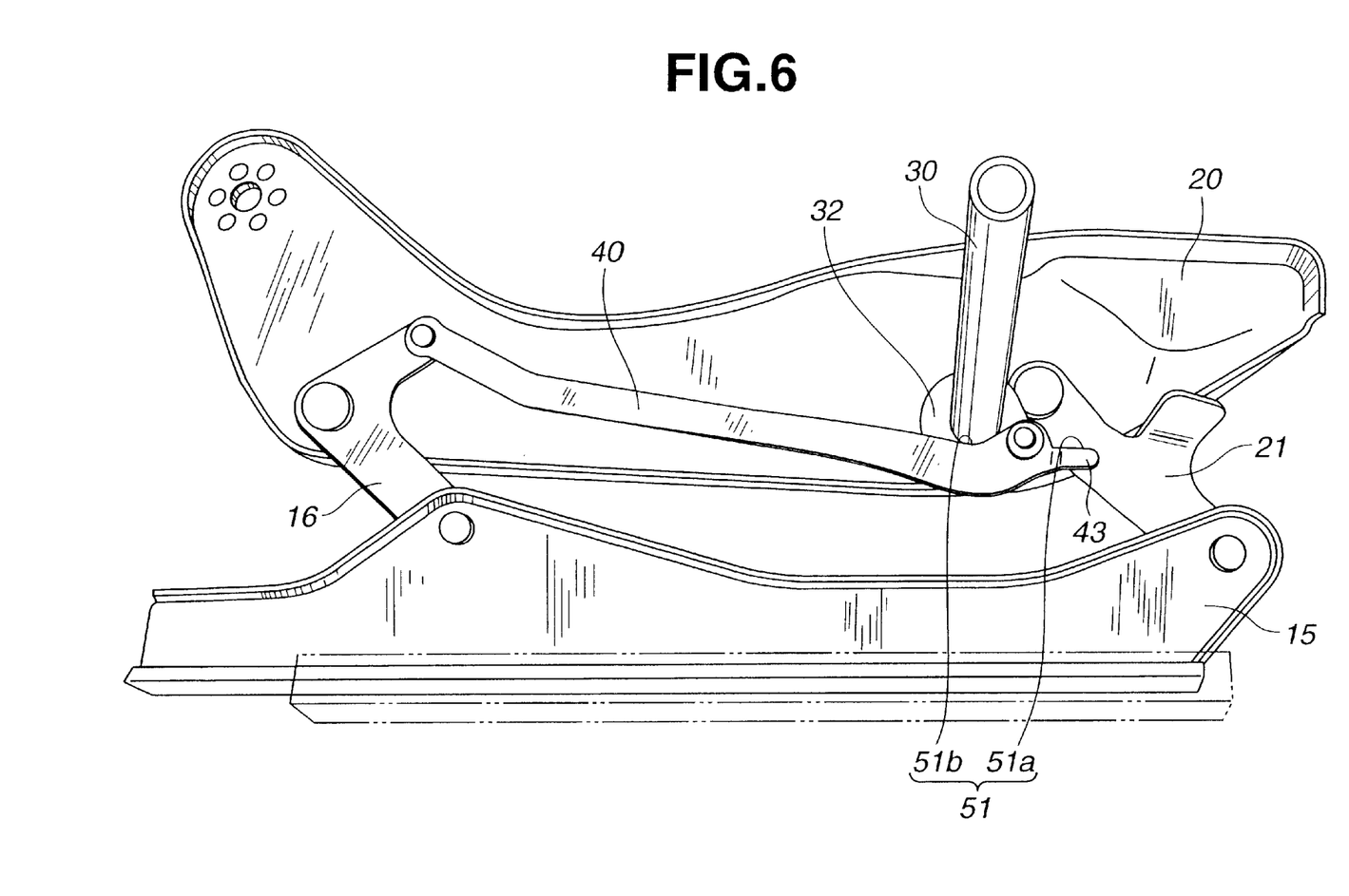
FIG. 6 is a view similar to FIG. 5, showing a driven-side cushion frame located in a lifting limit position with respect to a driven-side base frame.
Figure 7:
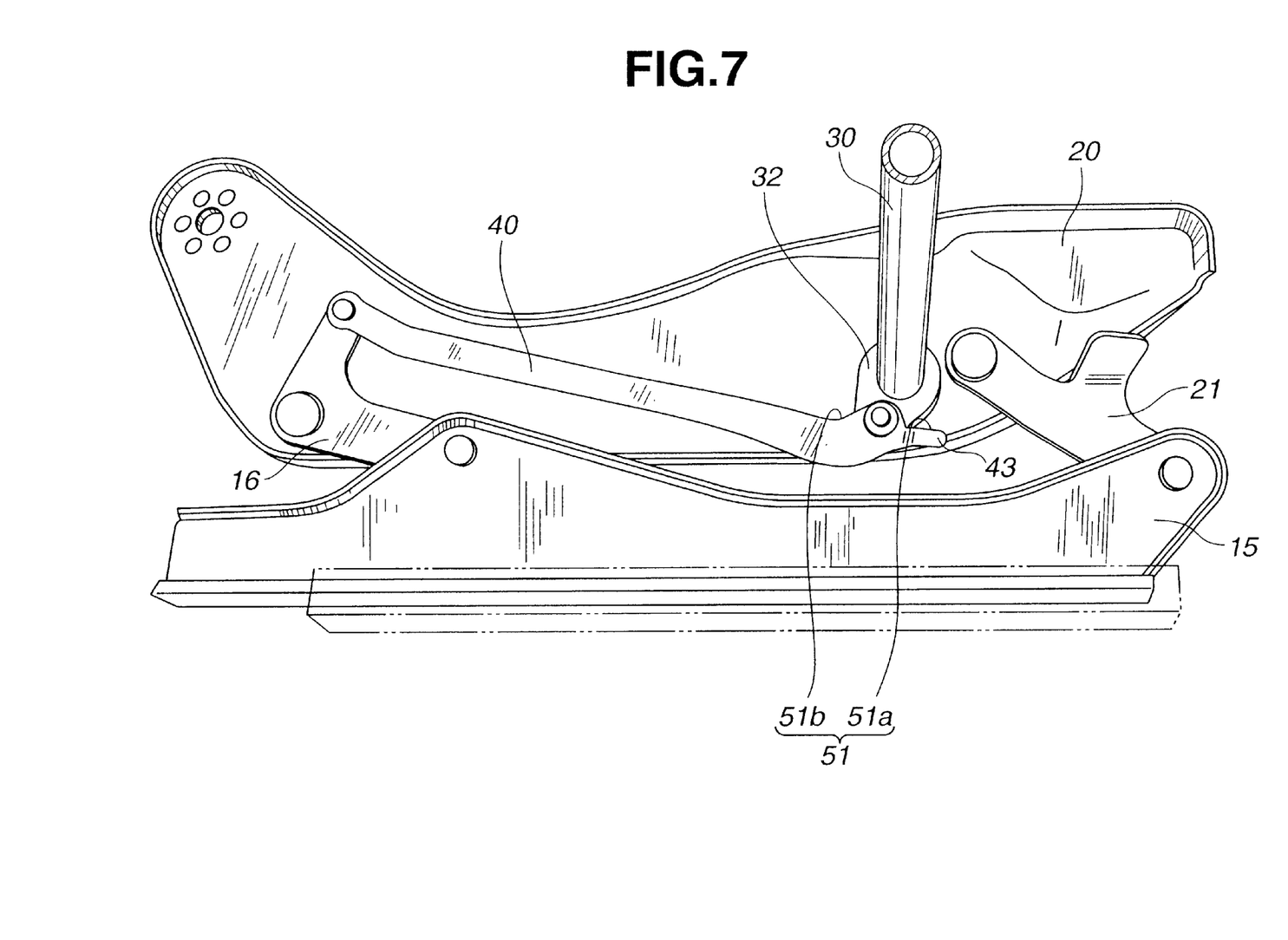
FIG. 7 is a view similar to FIG. 6, showing the driven-side cushion frame located in a middle position with respect to the driven-side base frame.
Figure 8:
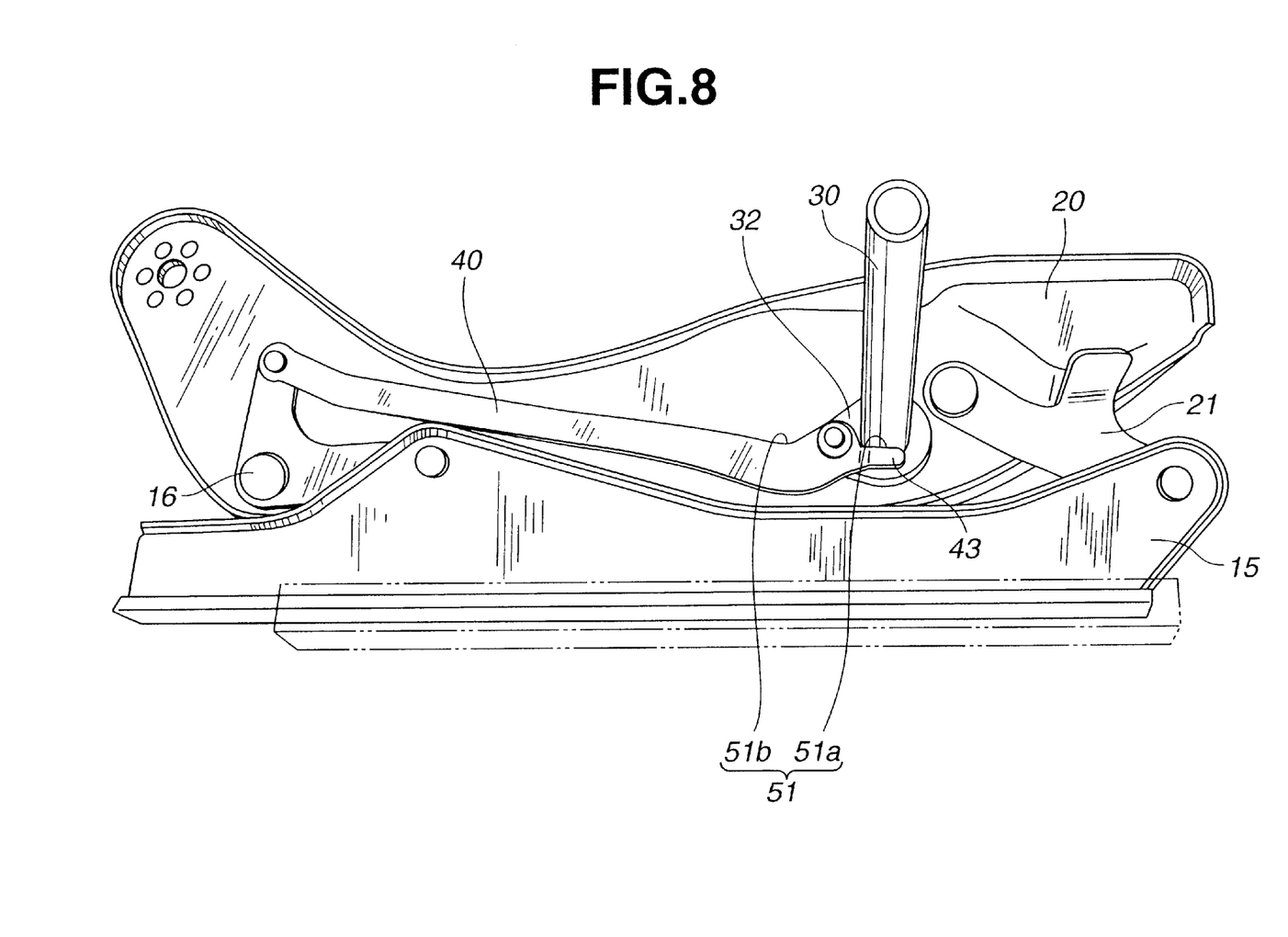
FIG. 8 is a view similar to FIG. 7, showing the driven-side cushion frame located in a lowering limit position with respect to the driven-side base frame.

Referring to FIGS. 6–8, with rotation of the sector gear 11, the connecting shaft 30 is also rotated, so that the driven-side connecting rod 40 linked with the connecting link 32 is swung to cause swinging of the driven-side bell crank 16, thus having upward/downward movement of the driven-side cushion frame 20 with respect to the driven-side base frame 15. Upward/downward movement of the driving-side cushion frame 7 with respect to the driving-side base frame 2 is synchronized with that of the driven-side cushion frame 20 with respect to the driven-side base frame 15.

At that time, with rotation of the sector gear 31, another end of the driving-side connecting rod 33 is rotatively moved below the connecting shaft 30. Referring to FIG. 3, when the driving-side cushion frame 7 is located in the lifting limit position with respect to the driving-side base frame 2, the lifting-side stopper portion 50b comprising part of another end of the driving-side connecting rod 33 abuts on the connecting shaft 30 from below to restrict rotation of the sector gear 31 in the direction of lifting the driving-side cushion frame 7 with respect to the driving-side base frame 2. Referring to FIG. 5, when the driving-side cushion frame 7 is located in the lowering limit position with respect to the driving-side base frame 2, the protrusion 36 formed at another end of the driving-side connecting rod 33 and serving as the lowering-side stopper portion 50a abuts on the connecting shaft 30 from below to restrict rotation of the sector gear 31 in the direction of lowering the driving-side cushion frame 7 with respect to the driving-side base frame 2. Specifically, the driving-side stopper 50 comprising the lifting-side stopper portion 50b and the lowering-side stopper portion 50a formed at another end of the driving-side connecting rod 33 restricts rotation of the sector gear 31.

With rotation of the connecting link 32, another end of the driven-side connecting rod 40 is also rotatively moved below the connecting shaft 30. Thus, referring to FIG. 6, when the driven-side cushion frame 20 is located in the lifting limit position with respect to the driven-side base frame 15, a lifting-side stopper portion 51b comprising part of another end of the driven-side connecting rod 40 abuts on the connecting shaft 30 from below to restrict rotation of the connecting link 32 in the direction of lifting the driven-side cushion frame 20 with respect to the driven-side base frame 15. Referring to FIG. 8, when the driven-side cushion frame 20 is located in the lowering limit position with respect to the driven-side base frame 15, the protrusion 43 formed at another end of the driven-side connecting rod 40 and serving as a lowering-side stopper portion 51a abuts on the connecting shaft 30 from below to restrict rotation of the connecting link 32 in the direction of lowering the driven-side cushion frame 20 with respect to the driven-side base frame 15. Specifically, a driven-side or second stopper 51 comprising lifting-side stopper portion 51b and lowering-side stopper portion 51a formed at another end of the driven-side connecting rod 40 restricts rotation of the connecting link 32.

In the illustrative embodiment, the structure of making the driving-side connecting rod 33 and the driven-side connecting rod 40 abut on the connecting shaft 30 can prevent disengagement of the sector gear 31 from the pinion gear 11. This results in no need of an additional part such as a stopper pin or additional machining after assembling so as to prevent disengagement of the sector gear 31 from the pinion gear 11, allowing a reduction in manufacturing cost.

Having described the present invention in connection with the illustrative embodiment, it is noted that the present invention is not limited thereto, and various changes and modifications can be made without departing from the scope of the present invention. By way of example, in the illustrative embodiment, in order to prevent disengagement of the sector gear 31 from the pinion gear 11, the driving-side connecting rod 33 and the driven-side connecting rod 40 abut on the connecting shaft 30 from below. Optionally, the driving-side connecting rod 33 and the driven-side connecting rod 40 may abut on the connecting shaft 30 from above by appropriately changing a mounting position of the driving-side connecting rod 33 with respect to the sector gear 31 and that of the driven-side connecting rod 40 with respect to the connecting link 32

The entire teaching of Japanese Patent Application P2002-158469 filed May 31, 2002 are hereby incorporated by reference.

What is claimed is:

1. A stopper structure for a seat lifter, comprising:
   a base frame;
   a bell crank rotatably mounted to the base frame;

a cushion frame linked with one swinging end of the bell crank;

a pinion gear rotatably mounted to one of the base frame and the cushion frame;

a connecting shaft rotatably mounted to the one of the base frame and the cushion frame;

a sector gear meshed with the pinion gear, the sector gear being fixed to the connecting shaft, the sector gear being rotated to swing the bell crank for upward and downward movement of the cushion frame with respect to the base frame;

a connecting rod having one end linked with another swinging end of the bell crank and another end linked with the sector gear in a position offset with respect to the connecting shaft; and a stopper formed at the another end of the connecting rod, the stopper abutting on the connecting shaft when the cushion frame is located in at least one of a lifting limit position and a lowering limit position with respect to the base frame, when the cushion frame is located in the lifting limit position the stopper restricting rotation of the sector gear in a direction of lifting the cushion frame with respect to the base frame, when the cushion frame is located in the lowering limit position the stopper restricting rotation of the sector gear in a direction of lowering the cushion frame with respect to the base frame.

2. A stopper structure for a seat lifter, comprising:

first and second base frames;

first and second bell cranks rotatably mounted to the first and second base frames, respectively;

first and second cushion frames linked with swinging ends of the first and second bell cranks, respectively;

first and second links having ends linked with the first and second base frames and other ends linked with the first and second cushion frames, respectively;

first and second connecting rods having ends linked with other swinging ends of the first and second bell cranks, respectively;

a pinion gear rotatably mounted to one of the first base frame and the first cushion frame;

a sector gear meshed with the pinion gear, the sector gear being linked with another end of the first connecting rod, the sector gear being rotated to swing the first and second bell crank for upward and downward movement of the first and second cushion frames with respect to the first and second base frames;

a connecting link fixed at the another end of the second connecting rod;

a connecting shaft having one end fixed to the sector gear and another end fixed to the connecting link, the one end being rotatably mounted to the one of the first base frame and the first cushion frame, another end being rotatably mounted to a corresponding one of the second base frame and the second cushion frame; and first and second stoppers formed at the another end of the first connecting rod and another end of the second connecting rod the first and second stoppers abutting on the connecting shaft when the first and second cushion frames are located in at least one of a lifting limit position and a lowering limit position with respect to the first and second base frames, when the first and second cushion frames are located in the lifting limit position the first and second stopper restricting rotation of the sector gear in a direction of lifting the first and second cushion frames with respect to the first and second base frames, when the first and second cushion frames are located in the lowering limit position the first and second stoppers restricting rotation of the sector gear in a direction of lowering the first and second cushion frames with respect to the first and second base frames.

* * * * *